April 19, 1966  S. AMIEL ET AL  3,247,380
DETERMINATION OF OXYGEN-18 BY BOMBARDMENT WITH ALPHA
PARTICLES AND DETECTION OF LIBERATED NEUTRONS
Filed June 5, 1962
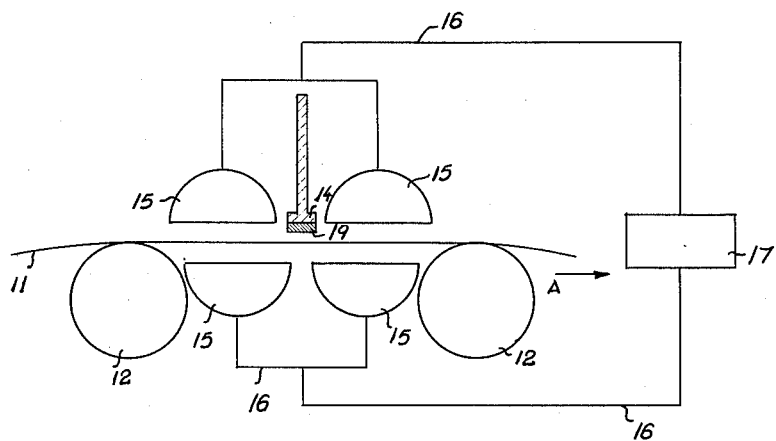
INVENTORS.
AHARON NIR
SAADIA AMIEL
OSTROLENK, FABER, GERB & SOFFEN
ATTORNEYS

United States Patent Office 3,247,380
Patented Apr. 19, 1966

3,247,380
DETERMINATION OF OXYGEN-18 BY BOMBARDMENT WITH ALPHA PARTICLES AND DETECTION OF LIBERATED NEUTRONS
Saadia Amiel and Aharon Nir, Rehovoth, Israel, assignors to Yeda Research and Development Co. Ltd., Rehovoth, Israel, a company of Israel
Filed June 5, 1962, Ser. No. 200,261
Claims priority, application Israel, June 6, 1961, 15,594
6 Claims. (Cl. 250—83.1)

It is an object of the present invention to provide a novel method for the determination of $O^{18}$. It is a further object of the present invention to provide a method for measuring the content of $O^{18}$ in gaseous, liquid and solid samples. It is still a further object of the present invention to provide a method for the continuous measurement of $O^{18}$ in strip-formed samples containing $O^{18}$, such as for example chromatograms and the like. It is an object of the present invention to provide means for effecting the determination of $O^{18}$ in gaseous, liquid and solid samples. It is yet a further object of the present invention to provide a non-destructive, simple and cheap method for the quantitative measurement of $O^{18}$ by means of which instantaneous data indicating the $O^{18}$ content of the sample can be obtained. Other and further objects of the present invention will become apparent hereinafter.

$O^{18}$ is widely used as a tracer in the study of various chemical, physical and biological reactions involving oxygen or oxygenous compounds.

The quantitative measurement of $O^{18}$ is conventionally effected by either of two methods. According to one of these the sample whose $O^{18}$ content is to be determined is processed so as to liberate its oxygen in gaseous form, either as pure oxygen or in the form of an oxygenous compound, and the amount of $O^{18}$ is determined in the collected gas by mass spectrometry. While this procedure is considered as very accurate, it involves elaborate preparatory steps of the gaseous product and the use of a mass spectrometer which is an expensive apparatus.

According to the second method, usually referred to as radioactivation, the sample whose $O^{18}$ content is to be determined is submitted to a radioactivating irradiation, e.g., by protons, and the quantity of $O^{18}$ is then determined by a measurement of the radioactivity of the product. This method also requires the use of bulky and expensive apparatus such as a proton accelerator, a nuclear reactor or the like, which is an obvious disadvantage.

In addition to the above drawbacks of the two known methods for the quantitative measurement of $O^{18}$, these methods have sometimes the disadvantage of involving the destruction of the sample. This is a very serious shortcoming as in this manner only one single measurement can be effected with each sample and it is, for example, impossible to study the changes of the $O^{18}$ content of one and the same sample as a function of time.

A further disadvantage of the above known methods for the measurement of $O^{18}$ is the fact that they are not instantaneous as there exists a considerable time lag between the beginning of the measurement and the time when the final result is obtained.

It is known that when $O^{18}$ is bombarded with α-particles it is partly converted into $Ne^{21}$ according to the reaction $O^{18}(\alpha,n)Ne^{21}$. It has now been found that the $(\alpha,n)$ reaction of $O^{18}$ is dominant under conditions most common in oxygen tracing experiments if the energy of the incident α-particles is kept within the range of 4 to 9 mev., as within this range the $O^{18}$ accounts for the large majority of the liberated neutrons while other nuclides which are also known to undergo $(\alpha,n)$ reactions if irradiated with α-particles, like lithium, beryllium and fluorine, interfere, to a small extent due to lower neutron yields and in most practical cases lower abundance. In other words, the quantity of neutrons originating under these conditions from other nuclides is relatively small and it may be neglected or subtracted and the net neutron count is directly proportional to the quantity of $O^{18}$.

The invention accordingly consists in a method for the quantitative measurement of $O^{18}$ comprising the steps of irradiating the sample whose $O^{18}$ content is to be measured with α-particles having an energy of from 4 to 9 mev., and counting the liberated neutrons as known per se.

In practice, the α-radiation source will be a natural or artificial radio-active material, e.g., $Po^{210}$, $Ra^{226}$, $Th^{228}$.

The sample whose $O^{18}$ content is to be measured is submitted to the α-irradiation without any preparatory steps. Accordingly this method provides instantaneous results. The quantity of $O^{18}$ which is converted into $Ne^{21}$ during the short period of measurement is a very small part of the total $O^{18}$ of the sample, so that the method according to the invention causes virtually no destruction of the sample.

The sample to be measured in accordance with the invention may be in solid, liquid or gaseous state and may either be measured while static or it may be moved through the beam of α-radiation.

A further advantage of the method according to the invention resides in the fact that it can be carried out in a continuous manner by passing continuously across the beam of α-radiation a series of samples or a continuous sample. In this matter an uninterrupted quantitative measurement of $O^{18}$ as a function of time, e.g., in a liquid reaction system, or as a function of the distance from a reference point, e.g., in case of a paper chromatogram, can be carried out. In a reaction system, containing $O^{18}$, determination of $O^{18}$ can be carried out at predetermined intervals of time, without interfering with the reaction in progress.

The invention also provides for an apparatus for the continuous quantitative measurement of $O^{18}$ comprising an emitter of α-particles having an energy of from 4 to 9 mev., means for continuously feeding samples to be measured into the space of the effective range of the α-particles and means for counting neutrons located within the effective range of the neutrons emitted by the irradiated sample.

The source of α-particles for use in accordance with the invention is preferably covered with a thin, inert layer which transmits α-radiation without being affected by it, in order to prevent the dispersion of the radio-active material.

The neutron yields from the reaction $O^{18}(\alpha,n)Ne^{21}$ using comparatively thick oxygen targets are:

For $Po^{210}$-(E=5.3 mev.), approximately $30.10^{-6}$ n/α;
For $Th^{228}$ (in equilibrium with decay products, E=5.4 to 8.8 mev.), approximately $1500.10^{-6}$ n/α.

As this inventioin may be embodied in several forms without departing from the spirit and essential characteristics thereof, the present embodiment is therefore illustrative and not restrictive, since the scope of the invention is defined by the appended claims rather than by the description preceding them, and all changes that fall within the metes and bounds of the claims, or of forms that are their functional equivalents are therefore intended to be embraced by these claims.

An apparatus according to the invention for determining the content of $O^{18}$ in a chromatogram is shown in the enclosed drawing in the figure, which is an elevational schematical side-view of such apparatus.

In this figure, 11 is a chromatogram of a material tagged with $O^{18}$, which is moved in the direction of arrow A over two movable pulleys 12 and 12'. A radioactive emitter 13 of alpha-particles of an energy of between 4 to 9 mev., is provided on carrier 14, so that the chromatogram beneath said emitter is within the effective range of the alpha particles. Furthermore, there are provided four neutron counters 15, connected by means of conductors 16 to the recorder 17. These neutron counters are within the effective range of the neutrons emitted from the irradiated sample and when the chromatogram is passed close to the emitter as shown, the recording obtained by means of the recorder will indicate the contents of $O^{18}$ of the chromatograms on its different portions. The recording is a continuous one and it is easy to obtain the correlation between the recording and the various parts of the chromatogram.

The following example is intended to give some illustrative numerical data.

*Example*

A sample of water in which 1% of the total oxygen present is $O^{18}$ is irradiated with 10 mc. of $Th^{228}$ which is in equilibrium with its decay products, which yields approximately 2000 neutrons per second. The counting efficiency is known to be 10% so that the sample produces altogether 200 neutron counts per second.

This result can be used as a standard for the measurement of unknown $O^{18}$ concentrations in other water samples.

What we claim is:

1. Method for the quantitative measurement of $O^{18}$ comprising the step of irradiating the sample whose content of $O^{18}$ is to be measured with α-particles having an energy of from 4 to 9 mev. and counting the liberated neutrons.

2. A method as claimed in claim 1, wherein the sample is provided as a chromatogram of a compound containing an increased quantity of $O^{18}$ which is passed at a predetermined rate close to a source of α-particles so as to result in the emission of neutrons from said sample which are counted.

3. An apparatus for the quantitative measurement of $O^{18}$ comprising an emitter of α-particles having an energy of from 4 to 9 mev., means for continuously feeding samples into the space of the effective range of 4 to 9 mev. of the α-particles and means for counting the neutrons emitted from the irradiated sample.

4. An apparatus as claimed in claim 3, wherein the sample is provided in the form of a chromatogram of the compound tagged by means of $O^{18}$.

5. An apparatus as claimed in claim 4, comprising means for indicating the correlation of the quantity of emitted neutrons and the location on the chromatogram corresponding to the given value.

6. An apparatus as claimed in claim 4, comprising an automatic recorder for recording the reading of the quantity of neutrons emitted by the varying portions of the strip.

References Cited by the Examiner

Nuclear Science Abstracts, vol. 12, January-March 1958, Abstracts 1715, Atomic Energy Publication.

Nuclear Science Abstracts, vol. 13, November-December 1959, Abstracts 20105, Atomic Energy Publication.

Radioisotope F–18: Preparation, Properties and Uses, by Adams et al., Peaceful Uses of Atomic Energy, United Nations Press, 1958, pages 219 to 223 in vol. 20.

RALPH G. NILSON, *Primary Examiner.*